United States Patent
Doubek

(10) Patent No.: US 9,316,274 B2
(45) Date of Patent: Apr. 19, 2016

(54) METHOD FOR OPERATING A POWERTRAIN IN A MOTOR VEHICLE

(71) Applicant: Bayerische Motoren Werke Aktiengesellschaft, Munich (DE)

(72) Inventor: Peter Doubek, Rattenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/558,786

(22) Filed: Dec. 3, 2014

(65) Prior Publication Data

US 2015/0088395 A1 Mar. 26, 2015

Related U.S. Application Data

(63) Continuation of application No. PCT/EP2013/060888, filed on May 27, 2013.

(30) Foreign Application Priority Data

Jun. 4, 2012 (DE) .................. 10 2012 209 386

(51) Int. Cl.
*B60W 10/02* (2006.01)
*F16D 48/06* (2006.01)
*B60W 50/00* (2006.01)
*B60W 10/06* (2006.01)
(Continued)

(52) U.S. Cl.
CPC .............. *F16D 48/06* (2013.01); *B60W 10/06* (2013.01); *B60W 10/30* (2013.01); *B60W 30/18072* (2013.01); *B60W 50/0097* (2013.01); *B60W 2030/1809* (2013.01); *B60W 2510/08* (2013.01); *B60W 2520/10* (2013.01); *B60W 2540/10* (2013.01); *B60W 2540/12* (2013.01); *B60W 2710/065* (2013.01); *B60W 2710/0655* (2013.01); *Y02T 10/84* (2013.01)

(58) Field of Classification Search
None
See application file for complete search history.

(56) References Cited

U.S. PATENT DOCUMENTS

| 8,622,872 B2 * | 1/2014 | Pedlar .................. B60W 10/02 477/181 |
| 8,818,600 B2 * | 8/2014 | Reed ..................... B60W 10/02 180/65.265 |

(Continued)

FOREIGN PATENT DOCUMENTS

| DE | 102 41 018 A1 | 3/2004 |
| DE | 103 20 187 A1 | 12/2004 |

(Continued)

OTHER PUBLICATIONS

German Search Report dated Jun. 28, 2012 with partial English-language translation (Nine (9) pages).

(Continued)

*Primary Examiner* — Dirk Wright
(74) *Attorney, Agent, or Firm* — Crowell & Moring LLP

(57) ABSTRACT

A method is provided for operating a powertrain in a motor vehicle, the powertrain having an internal combustion engine and components for coupling the internal combustion engine to the drive wheels of the motor vehicle in a controllable manner. The internal combustion engine is decoupled from the drive wheels if specified operating conditions are present while the motor vehicle is traveling in order to allow the vehicle to coast. Further, a rotational engine speed is set to a specified target idle speed. The target idle speed is specified in a variable manner depending on the situation.

9 Claims, 1 Drawing Sheet

(51) Int. Cl.
    *B60W 10/30*    (2006.01)
    *B60W 30/18*    (2012.01)

(56) References Cited

U.S. PATENT DOCUMENTS

2004/0138027 A1    7/2004    Rustige et al.
2006/0102393 A1    5/2006    Tumback et al.
2012/0046841 A1    2/2012    Wurthner et al.

FOREIGN PATENT DOCUMENTS

| DE | 10 2007 062 173 | A1 | 6/2009 |
|---|---|---|---|
| DE | 10 2008 029 453 | A1 | 12/2009 |
| DE | 10 2009 002 521 | A1 | 10/2010 |
| DE | 10 2009 057 551 | A1 | 6/2011 |
| EP | 0 601 300 | A1 | 6/1994 |
| WO | WO 02/94601 | A2 | 11/2002 |

OTHER PUBLICATIONS

International Search Report (PCT/ISA/210) dated Aug. 2, 2013 with English-language translation (Five (5) pages).

\* cited by examiner

METHOD FOR OPERATING A POWERTRAIN IN A MOTOR VEHICLE

CROSS REFERENCE TO RELATED APPLICATIONS

This application is a continuation of PCT International Application No. PCT/EP2013/060888, filed May 27, 2013, which claims priority under 35 U.S.C. §119 from German Patent Application No. 10 2012 209 386.9, filed Jun. 4, 2012, the entire disclosures of which are herein expressly incorporated by reference.

BACKGROUND AND SUMMARY OF THE INVENTION

The invention relates to a method for operating a powertrain in a motor vehicle, which powertrain has an internal-combustion engine and components for coupling the internal-combustion engine to the drive wheels of the motor vehicle in a controllable manner.

In the case of hybrid vehicles available today, the internal-combustion engine is switched off at least partially under specified operating conditions when the vehicle is driving, and the vehicle is driven only by an electric motor. This so-called "sail" mode, known in the case of hybrid vehicles while the internal-combustion engine is switched off, is to be used in the future also in the case of conventional vehicles without an electric hybrid drive.

Thus, from International Patent Document WO 02/094601, a method for operating a vehicle in a sail mode is known, in which, in coasting operating phases, in which neither the gas pedal nor the brake pedal is actuated, the internal-combustion engine is decoupled from the drive wheels. In this case, the rotational engine speed of the internal-combustion engine decreases to a rotational idling speed. As a result, the drag torques are reduced, whereby fuel savings are to be expected.

As a result of the separation of the internal-combustion engine from the powertrain or from the drive wheels and the falling of the rotational engine speed back to the defined rotational idling speed, shortfalls in the electric onboard power supply system may occur, because the electric energy generation, in the case of conventional motor vehicles having an internal-combustion engine, takes place predominantly by belt-driven generators. These generators supply more current as the rotational speed of the internal-combustion engine rises. Low rotational speeds—as here in the idle sail mode—may result in a so-called shortfall in the onboard power supply system, because a shortfall will already exist when the electric power generated prior to the sail mode is greater than the electric power generated in the idle sail mode. Depending on the amount of the shortfall as well as the duration and frequency, this may result in an increased wear of the battery as well as in a deterioration of the charge balance.

From the type-forming German Patent Document DE 10 2009 057 551 A1, a method is known for operating a powertrain in a motor vehicle, in which, when predefined operating conditions exist when the vehicle is driving, the internal-combustion engine is decoupled from the drive wheels; thus, a change takes place to a sail mode. The above-mentioned document further discloses that a sail mode can be set only when the charge of an electric power accumulator is not too low.

It is an object of the invention to provide a method for operating a vehicle in a sail mode while taking into account the providing of sufficient electric power.

This and other objects are achieved by a method according to the invention for operating a powertrain in a motor vehicle, which powertrain comprises an internal-combustion engine and components for the controllable coupling of the internal-combustion engine with the drive wheels of the motor vehicle, wherein when predefined operating conditions are present, in the case of the traveling motor vehicle, the internal-combustion engine is decoupled from the drive wheels in order to allow the vehicle to coast. The predefined operating conditions may be a coasting of the motor vehicle during which neither the gas pedal nor the brake pedal is actuated. As a further limitation, a decoupling may only be initiated when the speed of the vehicle is within a predefined speed window. Simultaneously with the decoupling of the drive wheels or after the decoupling of the drive wheels, the internal-combustion engine is controlled such that the rotational engine speed decreases to a predefined desired rotational idling speed.

This invention is based on the recognition that sufficient electric power can be provided only by a corresponding rotational engine speed of the internal-combustion engine and therefore a rotational speed of the internal-combustion engine which meets the requirements is to be set in the decoupled operation.

The invention is characterized in that the desired rotational idling speed is predefined or influenced in a variable manner depending on the situation; i.e. after the decoupling, the rotational engine speed is not set to a rotational idling speed that is always identical irrespective of different influence factors, but different demands and operating conditions can be taken into account as a result of the variability.

Advantageously, the desired rotational idling speed is determined as a function of the actual operating state of a generator coupled with the internal-combustion engine for generating current while the powertrain is still coupled, in order to thereby be able to prevent or counteract a shortfall occurring during the decoupling of the drive wheels. Since the generator current supply depends on the generator temperature, the rotational generator speed and the generator type, the desired rotational idling speed is advantageously determined as a function of the actually generated current, of the generator temperature while the powertrain is still coupled and/or the generator type. In particular, for calculating the desired rotational idling speed for the sail mode, the respective characteristic generator curve can be used; i.e. the desired rotational idling speed is determined from the type-specific and temperature-specific characteristic generator curve, in which case the actual current is used as the input quantity and the rotational engine speed required for this purpose is determined.

Depending on the amount of the determined desired idling speed, a sail mode is now either set or not set. Thus, in an advantageous further development of the invention, when the predetermined operating conditions are present, the desired rotational idling speed is determined and the internal-combustion engine is decoupled from the drive wheels and the rotational engine speed is set to the determined desired rotational idling speed when the determined desired rotational idling speed is within a predefined (configurable) rotational idling speed window or the determined desired rotational idling speed is lower than a predefined rotational idling speed threshold. The setting of the desired rotational idling speed or of a permissible rotational speed determined from the desired rotational idling speed because of clustering takes place by means of a rotational (idling) speed control element or an automatic rotational (idling) speed control element.

When the determined desired rotational idling speed is not within the predefined rotational idling speed window or the determined desired rotational idling speed is not lower than a predefined rotational idling speed threshold, the setting of the sail mode will not be useful; i.e. the decoupling of the internal-combustion engine from the drive wheels is prevented by placing a so-called sail preventor in the control unit. However, when a falling-below the generator current is not detected before the sail mode is taking place, this will not be taken into account and the sail mode will be continued.

As an additional measure, with or after the initiation of the sail mode, thus, with or after the decoupling of the internal-combustion engine from the drive wheels, a deactivation of different electric power consuming devices can also be carried out and/or predefined electric power consuming devices can be triggered or automatically controlled such that the power consumption will be reduced. A conceivable shortfall in the onboard power supply system can therefore also be positively influenced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
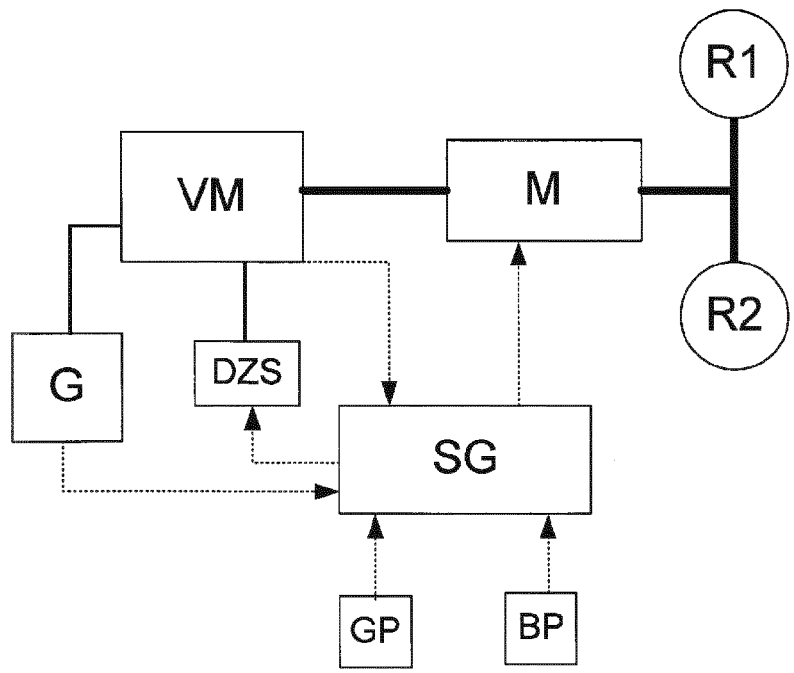
FIG. 1 is a view of a simplified construction of an exemplary powertrain with the additional components required for implementing the method according to the invention.

FIG. 1 shows the construction of a powertrain in a conventional motor vehicle, which has an internal-combustion engine VM and components M for the controllable coupling of the internal-combustion engine with the drive wheels R1 and R2 of the motor vehicle. The components M for the controllable coupling may, for example, be an automated clutch of an automatic or automated transmission. Furthermore, a belt-driven generator G for generating current is connected with the internal-combustion engine VM, which generator G supplies more current as the rotational speed of the internal-combustion engine VM increases.

In order to be able to decouple the internal-combustion engine VM from the drive wheels R1 and R2 when predefined operating conditions are present, a control unit SG is additionally present, which receives and analyzes at least signals from a gas pedal GP, a brake pedal BP, the generator G and the internal-combustion engine VM.

When a sailing mode, i.e. a decoupling of the internal-combustion engine VM from the drive wheels R1 and R2 and a setting of the rotational engine speed to the determined desired rotational idling speed is to take place, the control unit SG will send corresponding signals to the components M for the decoupling as well as to a rotational idling speed controller DZS connected with the internal-internal combustion engine.

Figure 2:
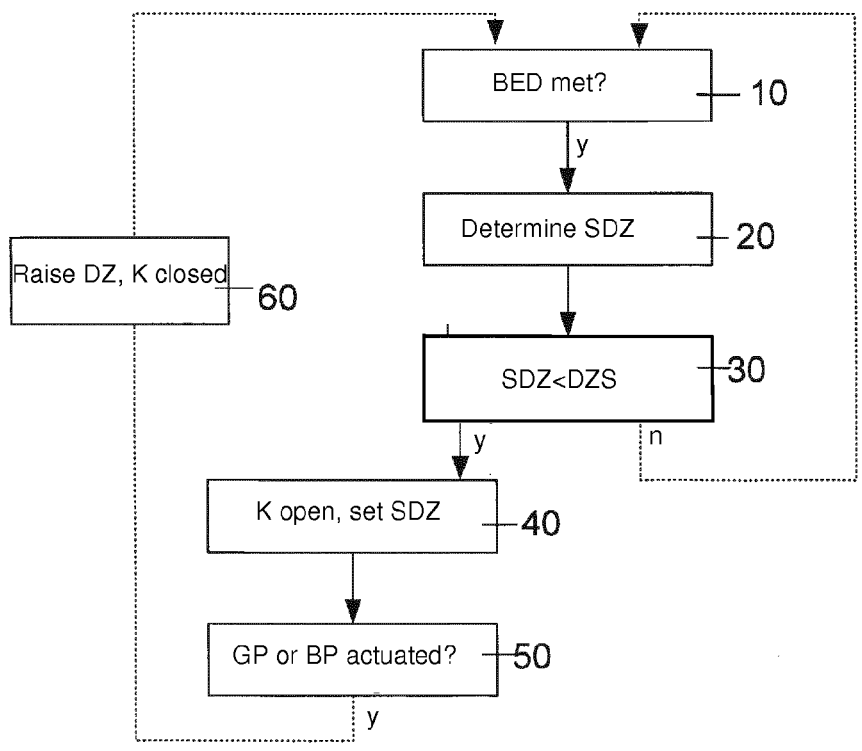
FIG. 2 is a simplified flow chart for illustrating an embodiment of the method according to the invention.

By means of FIG. 2, one exemplary embodiment of the method according to the invention is illustrated, which may be implemented, for example, with respect to the software in a corresponding control unit, such as the engine control unit of the vehicle.

The flow chart starts in Step 10, in which it is continuously queried whether the predetermined conditions (BED) are present for the initiating of a so-called sail mode in which the internal-combustion engine is, or is to be, decoupled from the drive wheels. These may, for example, be the following individual conditions:

the gas pedal is not actuated (for a predefined time interval);
the brake pedal is not actuated (for a predefined time interval);
the speed of the vehicle is within a predefined speed window.

When these predetermined conditions BED are present, in the next Step 20, a desired idling rotational speed SDZ to be set in the decoupled condition is generated from the type-specific and temperature-specific characteristic generator curve of the generator connected with the internal-combustion engine. In this case, the actual current of the generator is used as an input quantity and the corresponding desired rotational idling speed SDZ is determined.

In the next Step 30, it is checked whether the determined desired rotational idling speed SDZ is below a maximally permissible configurable rotational idling speed threshold DZS. The rotational idling speed threshold DZS is a function of acoustic demands and vibration comfort requirements. The minimum rotational speed (based on the desired idling rotational speed SDZ) for the sail mode is, in turn, set by way of adjacent automatic control systems, and is a function of the nominal rotational speed for the secure running of the engine and/or the necessary hydraulic pressure for maintaining coupling actuation of a relevant actuator.

When the determined desired rotational idling speed SDZ is not below the applicable rotational idling speed threshold DZS, a sail preventor is set; i.e. no transition takes place to the sail mode. The drive control is therefore not changed. The routine is terminated, and a jump takes place back to the start of the flow chart.

However, when the determined desired rotational idling speed SDZ is within the configurable rotational idling speed window (=y), a transition takes place to Step 40 and a change takes place to the sail mode. In this case, the clutch K, which is arranged between the internal-combustion engine and the drive wheels, is opened for decoupling the drive wheels. Furthermore, the determined desired rotational idling speed SDZ is fed to the rotational idling speed control element for setting the desired rotational idling speed SDZ. Here, either the determined rotational idling speed SDZ can be set directly, or a clustering of permissible rotational speeds can take place. When, for example, 820 rpm are demanded as the desired rotational idling speed, but for reasons relating to vibration, only 850 rpm are permissible, these 850 rpm are set. This clustering can also still take place in the control unit before the transfer to the idling rotational speed control element.

After the setting of the sail mode, a transition takes place to Step 50. It is monitored there whether conditions are present which require an exiting from the sail mode. In a simplified manner, in this example, only an actuating of the gas pedal GP and an application of the brake pedal BP are analyzed. When one of the two pedals GP or BP is actuated, for reasons of comfort, the rotational speed DZ of the internal-combustion engine will be increased again in Step 60, and the clutch K will be closed. Subsequently, the conventional drive control will take place again, and a return takes place to Step 10.

In addition, a deactivation of particularly power-demanding power consuming devices (loads), such as the seat heater and/or certain functions of the heating/air-conditioning unit during the sail mode may be performed (not shown here).

Since the method according to the invention counteracts critical conditions in the sail mode by a shortfall in the electric onboard power supply system, a high availability of the idling sail mode occurs while the availability of electric power remains the same without any negative influence on battery wear and therefore battery quality.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a motor vehicle powertrain having an internal-combustion engine and components for coupling the internal-combustion engine to drive wheels of the motor vehicle in a controllable manner, the method compromising the acts of:
   when the motor vehicle is traveling, decoupling the internal-combustion engine from the drive wheels under predefined operating conditions in order for the motor vehicle to coast, wherein
   a rotational engine speed of the internal-combustion engine is set to a predefined desired rotational idling speed, and
   the predefined desired rotational idling speed is variably predefined as a function of a situation of the motor vehicle.

2. The method according to claim 1, further comprising the act of:
   determining the predefined desired rotational idling speed as a function of an actual operating state of a generator coupled with the internal-combustion engine that generates current while the internal-combustion engine is still coupled with the drive wheels.

3. The method according to claim 2, wherein:
   the actual operating state of the generator is an actually generated current of the generator, a temperature of the generator while the powertrain is still coupled, a temperature-specific stored characteristic generator curve, a generator type, and/or a generator type-specific stored characteristic generator curve.

4. The method according to claim 3, wherein by way of the determined predefined desired rotational idling speed, the actually generated current of the generator before the decoupling of the internal-combustion engine from the drive wheels continues to be provided.

5. The method according to claim 1, further comprising the act of:
   when the internal-combustion engine is decoupled from the drive wheels, controlling the predefined desired rotational idling speed via an automatic rotational speed controller or a rotational speed controller.

6. The method according to claim 1, further comprising the acts of:
   when the predefined operating conditions are present, determining the desired rotational idling speed and setting the rotational engine speed is to the determined desired rotational idling speed or a rotational speed dependent on the determined desired rotational idling speed when the determined desired rotational idling speed is within a predefined rotational idling speed window or when it is more than a predefined rotational idling speed threshold.

7. The method according to claim 6, wherein when the predefined operating conditions are present, decoupling of the internal-combustion engine with the drive wheels is not carried out when the determined desired rotational idling speed is not within a predefined rotational idling speed window or is not lower than a predefined rotational idling speed threshold.

8. The method according to claim 1, wherein when the predefined operating conditions are present, decoupling of the internal-combustion engine with the drive wheels is not carried out when a determined desired rotational idling speed is not within a predefined rotational idling speed window or is not lower than a predefined rotational idling speed threshold.

9. The method according to claim 1, wherein:
   after the decoupling of the drive wheels, the method further comprises the acts of:
   deactivating predefined electric power consuming devices, and/or
   operating the predefined electric power consuming devices such that power consumption is reduced.

* * * * *